L. E. BAKER.
LOCKING CONTROL FOR POWER OPERATED MEASURING AND DISPENSING APPARATUS.
APPLICATION FILED FEB. 9, 1920.
1,395,697.
Patented Nov. 1, 1921.
4 SHEETS—SHEET 4.
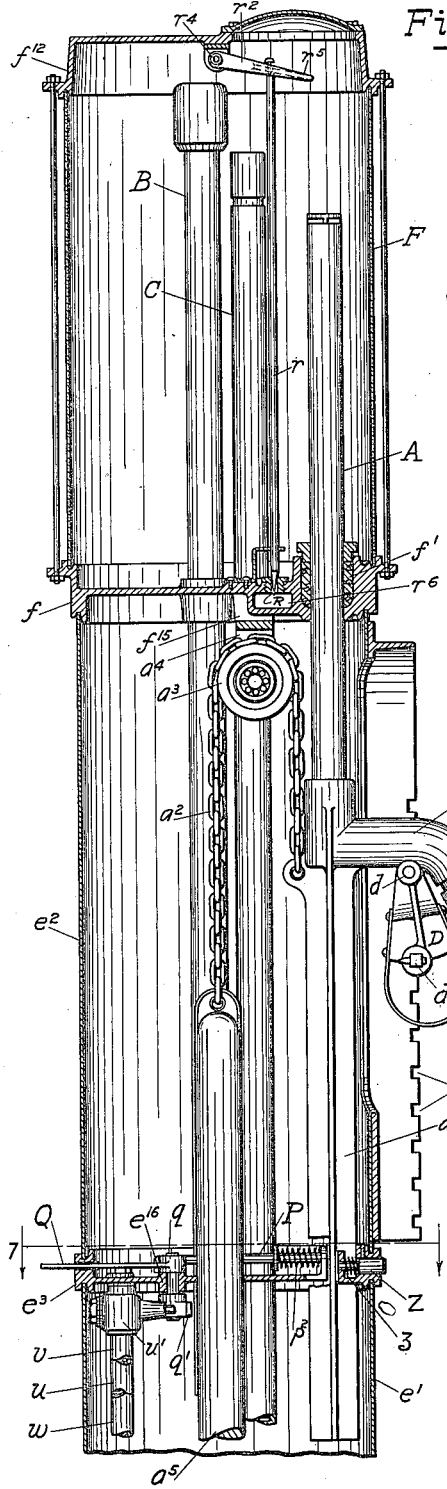
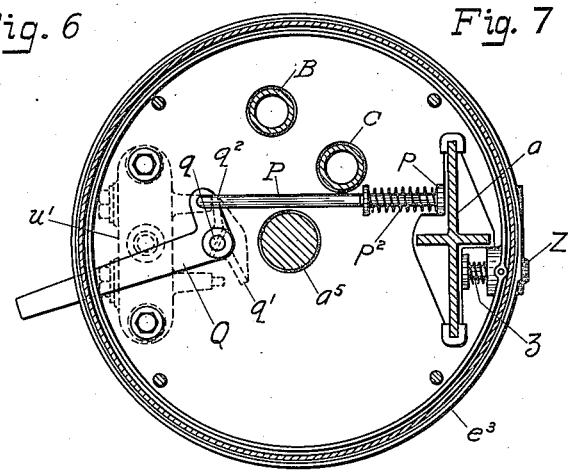
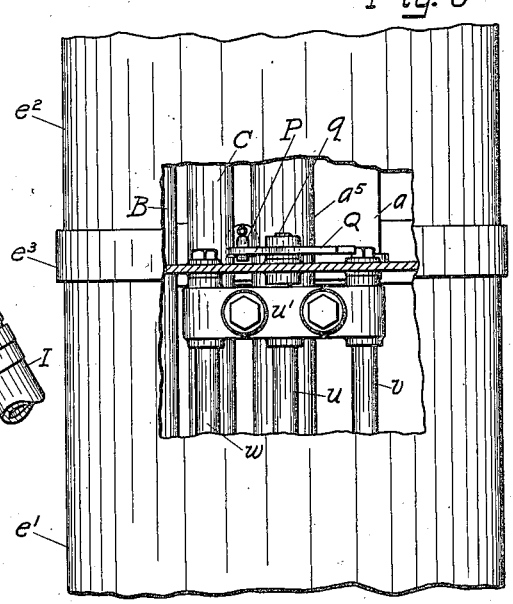
INVENTOR.
Linnaeus E. Baker
BY Walter A. Knight
ATTORNEY.

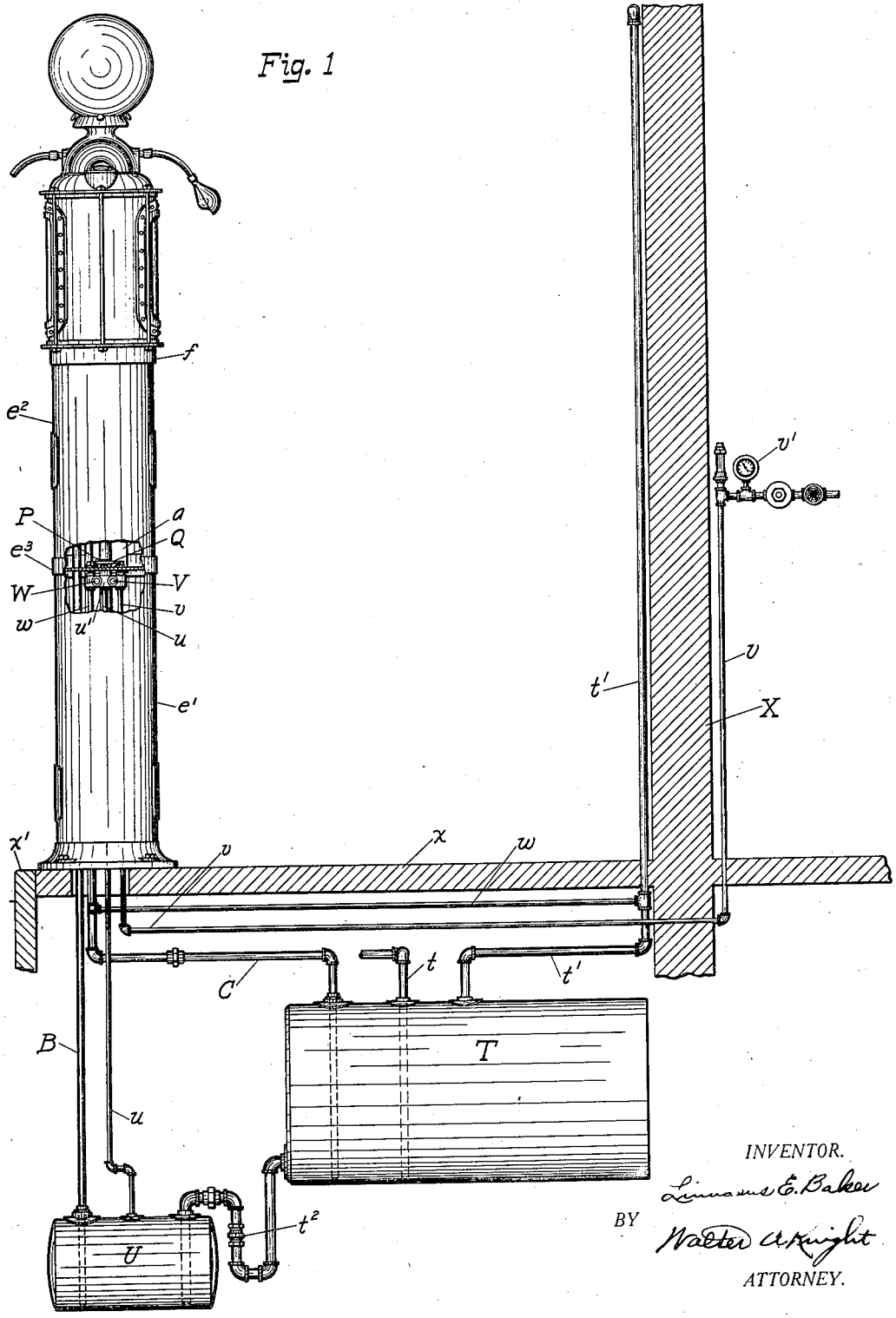

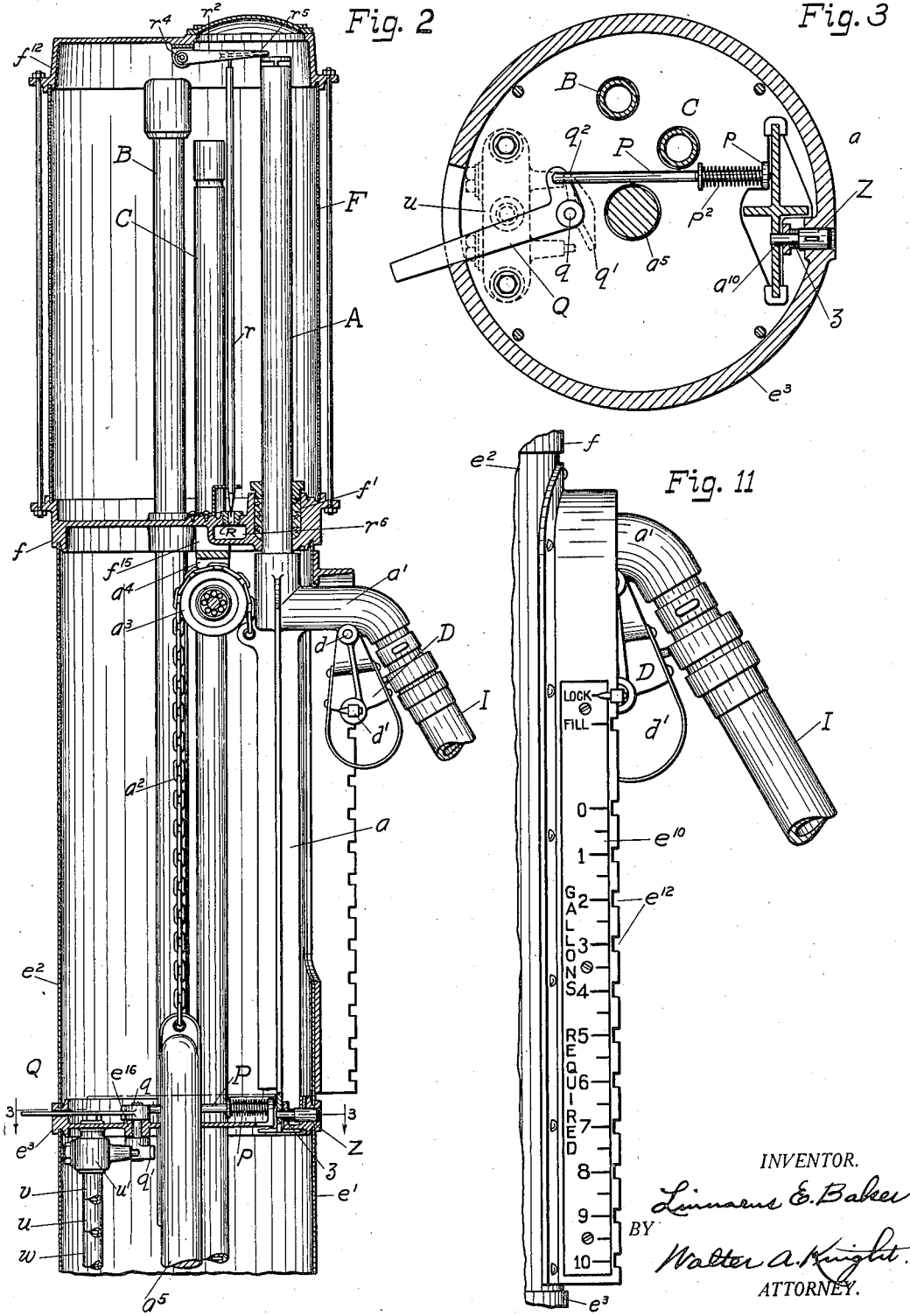

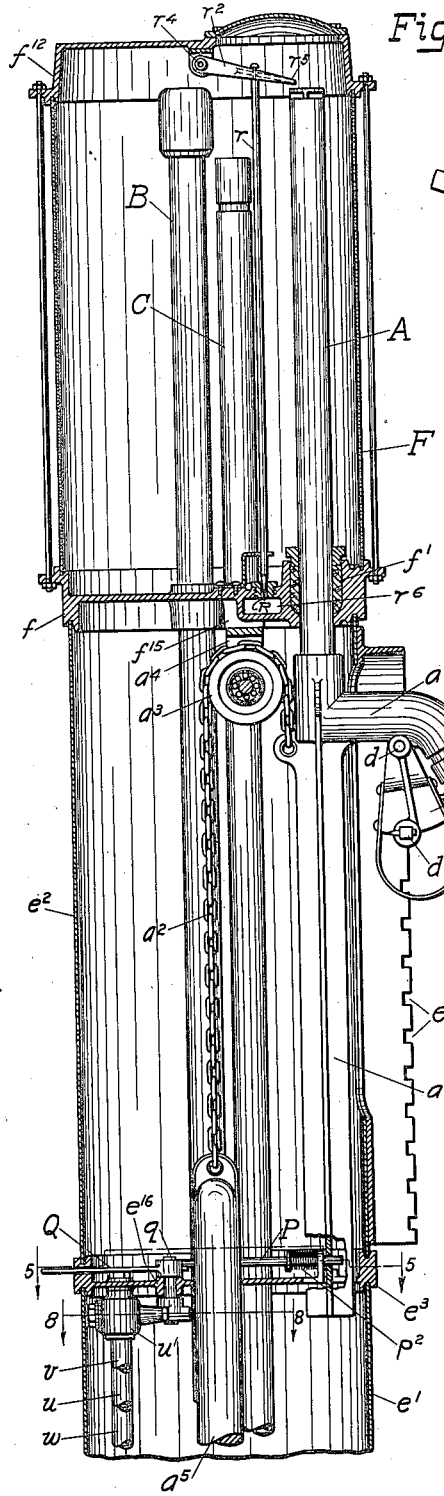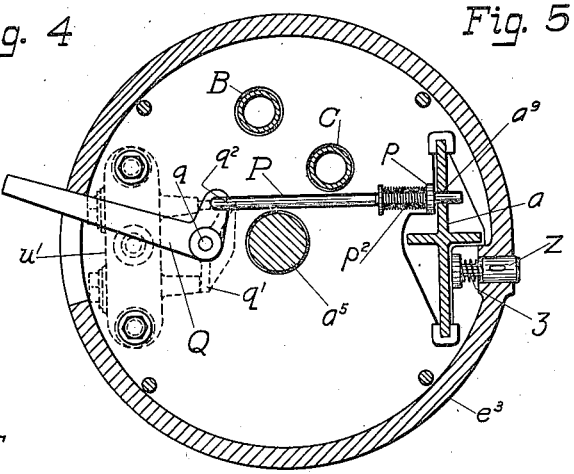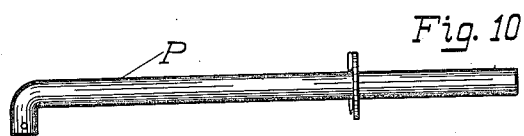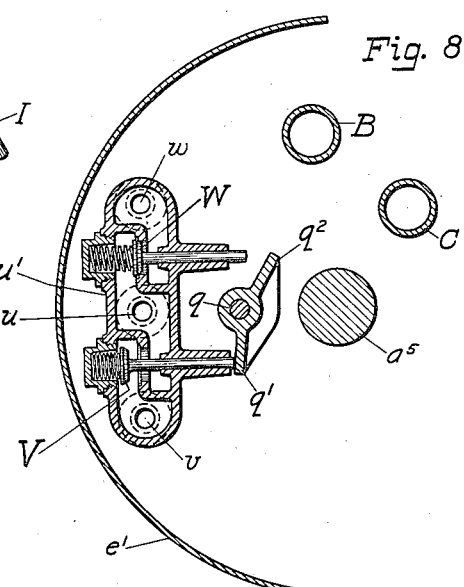

UNITED STATES PATENT OFFICE.

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

LOCKING CONTROL FOR POWER-OPERATED MEASURING AND DISPENSING APPARATUS.

1,395,697.     Specification of Letters Patent.     Patented Nov. 1, 1921.

Application filed February 9, 1920. Serial No. 357,231.

*To all whom it may concern:*

Be it known that I, LINNAEUS E. BAKER, a citizen of the United States, residing at Fort Wayne, in the county of Allen and State of Indiana, have invented new and useful Improvements in Locking Controls for Power-Operated Measuring and Dispensing Apparatus, of which the following is a specification.

My invention relates to liquid measuring and dispensing apparatus, and particularly to locking mechanism for controlling the filling and emptying of the elevated liquid containers of such apparatus.

The object of the invention is to prevent any filling of the elevated liquid container while the apparatus is set in discharging position; or in drain-back position, which is the lock-up position. This improvement insures correct measurement and safe operation of the apparatus.

My invention may be used in connection with any means of lifting or forcing the liquid from the underground tank or tanks to the elevated liquid container.

The particular embodiment of my invention selected for illustration is a liquid measuring and dispensing apparatus, in which the liquid to be dispensed is forced into the elevated container by air pressure.

Figure 1, is an elevation of the dispensing apparatus with the storage and auxiliary tanks and connections. Parts of the casing of the apparatus are broken away to disclose operating parts, Fig. 2, is a sectional elevation of the elevated liquid container and the upper part of the pedestal showing the apparatus in drain-back, which is lock-up position, Fig. 3, is a cross section on the line 3—3 of Fig. 2, as though the apparatus was there shown in full, Fig. 4, is the same as Fig. 2, but with the apparatus in position for filling the container, Fig. 5, is a cross section on the line 5—5 of Fig. 4, as though the apparatus was there shown in full, Fig. 6, is the same as Figs. 2 and 4, but with the apparatus in one of its positions for dispensing liquid, Fig. 7, is a cross section on the line 7—7 of Fig. 6, as though the apparatus was there shown in full, Fig. 8, an enlarged detail, is a cross section through the air valves on the line 8—8 of Fig. 4, Fig. 9, an enlarged detail, is an elevation of the air valve and its connections, as shown in Fig. 1, Fig. 10, an enlarged detail, is the plunger bolt, and Fig. 11, an enlarged detail, is a side elevation of the setting latch and scale.

Referring now to the drawings, X, is the outside wall of a garage or other building, with a gage $v^1$, on the inside of an air pressure line $v$, connected at one end to a compressor (not shown) and at the other to the valve V, of the dispensing and measuring apparatus set up on the sidewalk $x$, next the curb $x^1$.

The storage tank T, has a fill pipe, $t$, a vent pipe, $t^1$, and an overflow pipe, C, which latter terminates above at the zero level of the elevated liquid container, F, hereinafter to be described. The storage tank T, is connected to the auxiliary tank U, by pipe connections with a check valve, $t^2$, in the line, to prevent liquid under pressure in the tank U, from flowing back into the tank, T.

The auxiliary tank, U, has a pipe, $u$, by which air pressure is supplied to the tank U, from the pipe, $v$, through the valve V, and the manifold, $u^1$.

The pedestal is composed of, $e^1$, the bottom part, $e^2$, the top part and $e^3$, the flanged plate that joins them, all surmounted by a liquid container, comprising a suitable cylinder F, the bottom head $f$, and a top head $f^{12}$.

To the pedestal is secured a scale $e^{10}$, shown graduated by notches $e^{12}$, to gallons.

A vertically slidable discharge pipe A, passes upwardly through a stuffing box $f^1$, in the bottom head $f$, and is kept in exact alinement by the guiding extension $a$, passing through an opening in the flanged plate $e^3$. This guiding extension $a$, is integral with and extends downwardly from the bottom of an L $a^1$, which forms the lower end of the discharge pipe A. The horizontal portion of the L $a^1$, extends outwardly through the casing, and hose I, is attached thereto.

To any convenient part of the discharge pipe A, or its attendant parts, is secured one end of a cable or chain $a^2$, which passes over a pulley $a^3$, whose bracket $a^4$, is secured to the projecting lugs $f^{15}$, on the bottom head $f$, of the container. The other end of this chain $a^2$, is attached to a counter weight $a^5$, of suitable weight to counterbalance the weight of the discharge pipe A, L $a^1$, and guiding extension $a$, so as to insure easy movement up and down of the discharge pipe.

A setting latch D, is secured to the under side of the L $a^1$, by a pivot $d$, in such a manner as to oscillate at right angles to the plane passing through the axes of both branches of the L $a^1$. A latch bar $d^1$, is fixed in such a position that it will enter any of the notches $e^{12}$, when the latch D, is in engaging position.

A fill pipe B, and an overflow pipe C, pass upwardly through the bottom head $f$, terminating within the elevated container. In the bottom head $f$, is a drain orifice, R, to carry back to the storage tank the contents of the elevated container when desired. A needle-valve $r$, is adapted to keep the drain orifice R, normally closed and to be raised to open position by manipulation of the lever $r^2$, pivoted at $r^4$, to the top $f^{12}$. The free end $r^5$, of the lever $r^2$, is adapted to contact with and be raised by the top of the discharge pipe A, when it is raised to drain back position. The orifice R, is connected by a passage $r^6$, to the over-flow pipe C.

Upon the upper surface of the flanged plate, $e^3$, is a bracket, $p$, loosely pierced by a plunger bolt P, the outer straight end of which is adapted to pass through a hole, $a^9$, in the guiding extension, $a$, when the apparatus is in position for the elevated container to be filled. The bracket, $p$, bolt P, and hole $a^9$, constitute a keeper to prevent the resetting of the apparatus while the container is being refilled. A spring, $p^2$, normally holds the bolt, P, withdrawn from the hole, $a^9$. The inner end of the plunger bolt P, is hooked to form a pivot for its attachment to the bell-crank lever, Q, which is fixed to the vertical rock-shaft, $q$.

The rock-shaft, $q$, is journaled in a boss, $e^{16}$, of the flanged plate, $e^3$, and to its lower end is fixed a double-ended lever with an arm, $q^1$, to open the valve, V, to the pipe, $v$, to apply air pressure to the auxiliary tank U, to force liquid into the elevated container; and an arm, $q^2$, to open the valve W, to the pipe $w$, to relieve the auxiliary tank, U, of air pressure by opening it to the atmosphere, through the exhaust pipe $t^1$, and allow the auxiliary tank, U, to be refilled by gravity with liquid from the main storage tank T.

A bolt $z$, of a push bolt spring lock, Z, is adapted to enter a hole, $a^{10}$, in the guiding extension $a$, when the discharge pipe, A, is raised to lock up or drain back position (Fig. 2).

The operation of the device bearing my improvement, is as follows: When the apparatus is in lock-up which is also drain back position, as at night when not in use (see Fig. 2), the drain valve is open, the elevated liquid container empty, the lever Q, is in the position shown in Fig. 3, in which the auxiliary tank, U, is relieved of air pressure and open to the exhaust. Said lever is held in this position by the web of the guiding extension, $a$, through the engagement of the straight end of the plunger bolt therewith, the web, $a$, constituting a guard and the bolt, $z$, of the spring lock, Z, is in the hole, $a^{10}$, of the web of the guiding extension, preventing change of position of the discharge pipe.

When it is desired to use the apparatus, the bolt, $z$, is withdrawn from the hole, $a^{10}$, latch D is reset from "lock" to "fill" position (see Fig. 11) when the parts will be in the position shown in Fig. 4. Now the lever, Q, may be shifted so as to apply air pressure to the auxiliary tank because the plunger bolt, P, may enter the hole, $a^9$, causing the elevated container to be filled. While so filling, the position of the discharge pipe can not be changed because the guiding extension $a$, is held securely by the plunger bolt, P.

If filling is unnecessarily continued, any excess of liquid is drained back, through the overflow pipe, C, to the tank, T. When the lever Q is released the spring, $p^2$, withdraws the bolt, P, from the hole, $a^9$, and through the rock-shaft, $q$, and the lever $q^1$, permits the valve, V, to close shutting off air pressure from the tank U, and the lever $q^2$, opens the valve W, releasing the pressure on the tank, U, by permitting air to escape through the pipe $w$ and vent, $t^1$, permitting the tank U, to fill by gravity from the tank, T.

Liquid from the elevated container may now be discharged through the hose I, by resetting the latch D, to such a position on the scale, $e^{10}$, as indicates the amount of liquid the purchaser wants, (see Fig. 6). While so dispensing liquid, no filling of the elevated container can go on because the lever, Q, cannot be shifted to refilling position as the bolt, P, bears against the web of the guiding extension, $a$, and prevents shifting of the lever.

If an electrically driven pump is used instead of air pressure as here illustrated and described, the lever, Q, and its attendant parts will operate an electric switch instead of valves, and no auxiliary tank will be needed, but the pump will transfer the liquid direct from the storage tank to the elevated liquid container, but the locking mechanism constituting the gist of my invention will remain the same.

Regardless of the form of power applied to such apparatus, locking mechanism for simultaneously controlling the application of power and safe-guarding the use of measuring and dispensing apparatus against improper handling, is within the spirit of my invention.

I claim as my invention and desire to secure by Letters Patent of the United States:—

1. In combination with a power operated measuring and dispensing apparatus having an elevated liquid container, means for setting the apparatus in filling position, means for filling the elevated liquid container, a keeper to prevent the resetting of the apparatus while the elevated liquid container is being filled, a guard to prevent the application of power except when the apparatus is in fill position and a unitary control to throw the keeper into lock position and turn on the power.

2. In combination with a power operated measuring and dispensing apparatus having an elevated liquid container, means for filling the elevated liquid container, a keeper to prevent any change of the setting of the apparatus while the elevated liquid container is being filled, a guard to prevent the application of power except when the apparatus is in fill position, a unitary control to throw the keeper into lock position and turn on the power and means for normally holding the unitary control in unlocked and power-off position.

3. In combination with a measuring and dispensing apparatus operated by power, an elevated liquid container, means for setting the apparatus in filling position, a vertically slidable discharge pipe to dispense liquid from said container, a keeper adapted to prevent the resetting of the apparatus while the elevated liquid container is being filled, a guiding extension on said discharge pipe constituting also a guard for said keeper in all but fill position of the discharge pipe and preventing the resetting of the apparatus while the elevated liquid container is being filled, an opening in said extension to receive said keeper when the discharge pipe is in fill position, a power connection and a control for turning said power on and off, and the keeper and control being connected so that only when the keeper registers with the opening in the extension, can the power be turned on.

4. In combination with a measuring and dispensing apparatus operated by power, an elevated liquid container, means for setting the apparatus in filling position, a vertically slidable discharge pipe to dispense liquid from said container, a keeper adapted to prevent the resetting of the apparatus while the elevated liquid container is being filled, a guiding extension on said discharge pipe constituting also a guard for said keeper in all but fill position of the discharge pipe, an opening in the extension to receive said keeper when the discharge pipe is in fill position, and to prevent the resetting of the apparatus while the elevated liquid container is being filled, a power connection in which the power is normally off, and a control for turning the power on, the keeper and the control being so connected as to operate the keeper and turn on the power simultaneously.

5. In combination with a measuring and dispensing apparatus operated by fluid power; an elevated liquid container, means for setting the apparatus in filling position, a keeper to prevent the resetting of the apparatus while the elevated liquid container is being filled, a guard to prevent the application of power except when the apparatus is in fill position, a manifold with a valve controlled power fluid inlet, a valve controlled power fluid outlet to waste, an open power fluid outlet to use, and unitary means for opening either of said valves at will and throwing the keeper into engaging position simultaneously with the opening of the valve controlling the inlet for power fluid.

In testimony whereof I have hereunto set my hand in presence of two subscribing witnesses.

LINNAEUS E. BAKER.

Witnesses:
J. M. KLINGENBERGER,
U. A. ARNOLD.